(12) United States Patent
Kwon et al.

(10) Patent No.: US 8,204,562 B2
(45) Date of Patent: Jun. 19, 2012

(54) SUPERCONDUCTING SYNCHRONOUS MACHINE

(75) Inventors: Young Kil Kwon, Changwon-si (KR); Ho Min Kim, Changwon-si (KR); Seung Kyu Baik, Changwon-si (KR); Eon Young Lee, Gimhae-si (KR); Jae Deuk Lee, Masan-si (KR); Sang Ho Lee, Jinhae-si (KR); Yeong Chun Kim, Changwon-si (KR); Young Sik Jo, Gimhae-si (KR); Gang Sik Ryu, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 769 days.

(21) Appl. No.: 12/330,836

(22) Filed: Dec. 9, 2008

(65) Prior Publication Data

US 2009/0093369 A1  Apr. 9, 2009

(30) Foreign Application Priority Data

Oct. 2, 2007  (KR) .................. 10-2007-0099338
Oct. 1, 2008  (WO) ............... PCT/KR2008/005759

(51) Int. Cl.
*H02K 55/04* (2006.01)
*H02K 55/02* (2006.01)

(52) U.S. Cl. .......... 505/166; 505/211; 505/878; 310/54; 310/52; 310/64

(58) Field of Classification Search .................. 505/166, 505/211, 892, 878, 894, 877; 310/52, 54, 310/64; 62/51.1, 434
See application file for complete search history.

(56) References Cited

FOREIGN PATENT DOCUMENTS

| JP | 2005-237060 A | | 9/2005 |
| KR | 10-2004-0009259 A | | 1/2004 |
| KR | 2004-009259 | * | 1/2004 |
| KR | 10-2005-0101594 A | | 10/2005 |

OTHER PUBLICATIONS

International Search Report for PCT/KR2008/005759 (WO 2009/045038 A3), WIPO, Mar. 26, 2009.

* cited by examiner

*Primary Examiner* — Stanley Silverman
*Assistant Examiner* — Kallambella Vijayakumar
(74) *Attorney, Agent, or Firm* — Park & Associates IP Law, P.C.

(57) ABSTRACT

Disclosed herein is a superconducting field coil of a homopolar type superconducting synchronous machine. The superconducting synchronous machine includes a superconducting field coil which comprises a single or double pancake coil formed by winding a superconducting wire, a core-type rotor which is made of a magnetic material, and an armature winding excited to three phases on a surface of a core of a stator. The field coil of the homopolar type superconducting synchronous machine is not rotated when the machine is in operation. Thus, there is no part for coupling the rotating field coil to a stationary cryo-cooler for cooling a refrigerant, so that the structure is simple, reliability is high, and various cooling methods are available.

10 Claims, 2 Drawing Sheets

SUPERCONDUCTING SYNCHRONOUS MACHINE

REFERENCE TO RELATED APPLICATIONS

This a continuation of pending International Patent Application PCT/KR2008/005759 filed on Oct. 1, 2008, which designates the United States and claims priority of Korean Patent Application No. 10-2007-0099338 filed on Oct. 2, 2007, the entire contents of which are incorporated herein by reference.

FIELD OF THE INVENTION

The present invention relates to a superconducting field winding of a superconducting synchronous machine which is constructed of a rotor including two inductors made of a magnetic material and a field core, a field winding comprising a superconducting winding which is not rotated while it is in operation, the field winding being excited by DC power such that one of the two inductors becomes a N pole and the other becomes a S pole, an air-cored armature winding which is excited to 3 phases being placed around each inductor, and an outermost part surrounded by a mechanic shield, and relates to the structure of a coil and a cooling method.

BACKGROUND OF THE INVENTION

Generally, in a conventional phase conduction motor, a core made of a magnetic material, such as laminated silicon steel plates, occupies most of the weight of a rotor, and a field and an armature coil are inserted into a slot having the core. Meanwhile, a superconducting motor uses a superconducting field winding which generates a strong magnetic field, thus generating the same output as that of the conventional phase conduction motor with the size of ½ to ⅓ of that of the conventional phase conduction motor without using the core in the motor.

In order to obtain a desired output in the air-cored structure that does not use the core, a field coil is placed in a rotating cryostat, so that a strong magnetic field is formed under a superconducting condition. Thus, devices for cooling a superconducting coil must be placed together with electrical coils. In the case of a field coil made of Bi2223 oxide-based superconducting wires which are not used in existing rotary machine technology and have been currently used in cryo-technology, the field coil is cooled to about 30K, and liquid neon or helium gas is mainly used as a refrigerant.

The superconducting motor/generator is advantageous in that a strong magnetic field can be generated in the superconducting field coil, so that size and weight are remarkably reduced in comparison with a conventional machine, and efficiency can be increased. However, the superconducting motor/generator is disadvantageous in that the superconducting field coil must be cooled to a very low operating temperature of 50K or less. Further, even if a stationary superconducting magnet, such as an MRI, uses a metal-based superconducting wire which must be cooled to 4.2K, technical difficulties are absent because of the development of cryogenic cooling technology. However, in order to supply a refrigerant to the rotating superconducting field coil, such as a superconducting rotary machine, very low temperature must be maintained in a stationary cryo-cooler in which the refrigerant is liquefied and also in a duct through which the refrigerant flows in and out, and a part for coupling a rotary part to a stationary part is required. In order to solve this problem, a Ferro-fluid seal is installed. However, the coupling part is complex in structure and is weak, so that reliability becomes deteriorated when the motor/generator has been operated for a lengthy period of time, and cooling efficiency becomes deteriorated. Thereby, the entire efficiency of the superconducting motor/generator is reduced.

Since the rotating cryogenic superconducting field coil usually generates a DC magnetic field, it is used as the field coil of a synchronous machine or a DC machine. A phase conducting copper coil which has been used in an existing motor is used in an armature winding in which an AC magnetic field is generated.

Thus, most superconducting machines which have been currently developed are constructed so that a magnetic field shield is provided on the outermost layer of the machine by layering a ferromagnetic body applied to the existing rotary machine in a cylindrical form, and a three-phase conduction coil is arranged inside the mechanical shield.

A warm damper manufactured using aluminum or copper and having good electrical conducting ability is installed between the armature winding and the superconducting field coil, flows inducing current when the existing synchronous machine is stepped out, thus aiding in recovering a synchronous speed. Further, the warm damper serves to prevent an AC magnetic field generated in the armature winding from affecting the superconducting field coil generating a DC magnetic field. A cryogenic damper placed between the cryostat and the superconducting field coil serves to shield radiant heat transferred from an outer covering of the rotor. Generally, the warm damper is used when using the oxide-based superconducting wires having high invariability.

Since the superconducting motor/generator currently developed has a rotary field structure, the problems of the cryogenic cooling system of the superconducting machine, that is, the complex structure for cooling the rotating superconducting field coil, the deterioration of reliability and the reduction in cooling efficiency due to long operation must be overcome. That is, improving the cryogenic cooling system of the superconducting rotary machine is required. Further, when the superconducting field coil has an air-cored configuration in a middle or small machine of about 10 MW, too many superconducting wires which are expensive are required, so that the economic efficiency of the superconducting motor/generator is low.

SUMMARY OF THE INVENTION

Accordingly, the present invention has been made keeping in mind the above problems occurring in the prior art, and an object of the present invention is to provide a superconducting field coil used in a superconducting motor/generator, which overcomes the problems of an existing cryogenic cooling system and minimizes the amount of superconducting wires required in a machine of the same capacity.

In order to accomplish the above object, the present invention provides a superconducting synchronous machine, including a superconducting field coil which comprises the superconducting field coil formed by winding a superconducting wire, and exciting DC power, and the superconducting field coil is installed in a refrigerant tank which contains a cryogenic refrigerant, such as liquid nitrogen or liquid neon, and is directly connected to a cryo-cooler to be cooled through a conduction cooling method.

In a further embodiment of the present invention, the superconducting field coil further including a rotor provided on each of opposite ends of the superconducting field coil and the refrigerant tank, a core-type stator provided outside the rotor, an air-cored armature winding provided on an inner surface of the stator in such a way as to surround the inductor, and excited to three phases.

In a further embodiment of the present invention, the superconducting field coil further including a damper provided to surround the superconducting field coil, and intercepting radiant heat from the rotor and an AC magnetic field generated from the armature winding.

Further, the refrigerant tank further including several layers of super-insulation surround the refrigerant tank to prevent penetration of radiant heat, and a vacuum layer is provided between the refrigerant tank and the damper.

In a further embodiment of the present invention, the present invention provides a superconducting synchronous machine, including a superconducting field coil which comprises a single pancake coil or a double pancake coil formed by winding a superconducting wire and excites DC power, a rotor including a core-type inductor which is provided on each of opposite ends of the superconducting field coil and made of a magnetic material, a field core which is provided in a center of the superconducting field coil, and a shaft which is coaxially mounted to the inductor and the field core and rotates around an axis, a core-type stator which is provided outside the rotor, an air-cored armature winding which is provided on the inner surface of the stator and is excited to three phases, and a damper which is provided to surround the superconducting field coil and intercepts radiant heat from the rotor and an AC magnetic field generated from the armature winding. Here, the superconducting field coil is installed in a refrigerant tank which contains a cryogenic refrigerant, such as liquid nitrogen or liquid neon, and is directly connected to a cryo-cooler to be cooled through a conduction cooling method, and several layers of super-insulation surround the refrigerant tank to prevent penetration of radiant heat, and a vacuum layer is provided between the refrigerant tank and the outer circumference of the field core or between the refrigerant tank and the damper.

Further, the inductor includes a first inductor which is integrated with the field core and has a plurality of salient poles protruding diametrically from an end of the field core, and a second inductor which is provided to be opposite the first inductor and has a plurality of salient poles.

The superconducting field coil is provided between the salient poles of the first and second inductors. The superconducting field coil is made of a BSCCO or YBCO superconducting wire, and comprises a plurality of single or double pancake coils.

In order to cool a superconducting field coil such as the one described above, the superconducting field coil may be installed in the refrigerant tank, and may be cooled by refrigerants such as liquid nitrogen or liquid neon. According to the present invention, the field coil is stationary, so that the cryocooler is directly connected to the field coil and thus the field coil is cooled through a conduction cooling method.

Further, the damper is provided outside the refrigerant tank and made of an aluminum or a copper alloy material so as to have strength for maintaining a strong vacuum, in addition to shielding an AC magnetic field which is generated in the event of abnormal operation.

High vacuum layers are installed between the outer circumference of the field coil and the inner circumference of the refrigerant tank, and between the outer circumference of the refrigerant tank and the inner circumference of the damper, thus preventing the penetration of heat to the refrigerant tank. Further, several layers of super-insulation are installed around the refrigerant tank, thus preventing the penetration of radiant heat.

The damper must serve to intercept the penetration of an AC magnetic field from the armature coil occurring during abnormal operation, in addition to maintaining a strong vacuum, so that the damper is preferably made of aluminum or copper alloy, which has sufficient strength and superior ability to conduct electricity.

Advantageous Effects:

As described above, the present invention provides a superconducting synchronous machine, in which a superconducting field coil is not rotated when the machine is in operation, so that it is easier and simpler to design a cooling system for cooling the superconducting field coil in comparison with a revolving-field type superconducting synchronous machine, thus increasing the reliability and stability of the machine, and reducing the volume of the whole system.

Further, a damper is installed between salient poles of first and second inductors, so that an effective gap is reduced. Since the rotor is made of a magnetic material, the loss of magneto-motive force is reduced, so that the amount of superconducting wire is reduced. Since the field core 220 becomes a course of magnetic flux generated by the field core, the effect of the magnetic field acting on the superconducting field coil 100 is reduced and quenching caused by the magnetic field which may be generated in the field coil 100 is reduced.

Further, air-gap magnetic flux density is not alternated, so that the volume of the machine is increased, but the cooling system is simplified and the volume of the whole system is reduced. The machine may be multipolarized through a change in the number of the inductors. The superconducting field coil has the single or double pancake form, thus making it easy to perform a winding operation.

DESCRIPTION OF REFERENCE NUMERALS OF MAIN PART OF THE DRAWINGS

| 100: superconducting field coil | 110: refrigerant tank |
|---|---|
| 120: vacuum layer | 200: rotor |
| 210: inductors | 211: first inductor |
| 212: second inductor | 213: salient poles |
| 220: field core | 230: shaft |
| 300: stator | 400: armature windings |
| 500: damper | 600: cryo-cooler |

DETAILED DESCRIPTION OF THE INVENTION

Hereinafter, the preferred embodiment of the present invention will be described in detail with reference to the accompanying drawings.

As the preferred embodiment of the present invention, a homopolar type superconducting synchronous machine will be described below. In the synchronous machine, the number of the poles of a rotor 200 is six and an armature winding 400 is wound in an air-cored configuration.

Generally, the homopolar type superconducting synchronous machine is the synchronous machine which is rotated at a synchronous speed for the number of the poles and the operating frequency of the machine. Here, the operating speed of the synchronous machine is not affected by variation of load.

Figure 1:
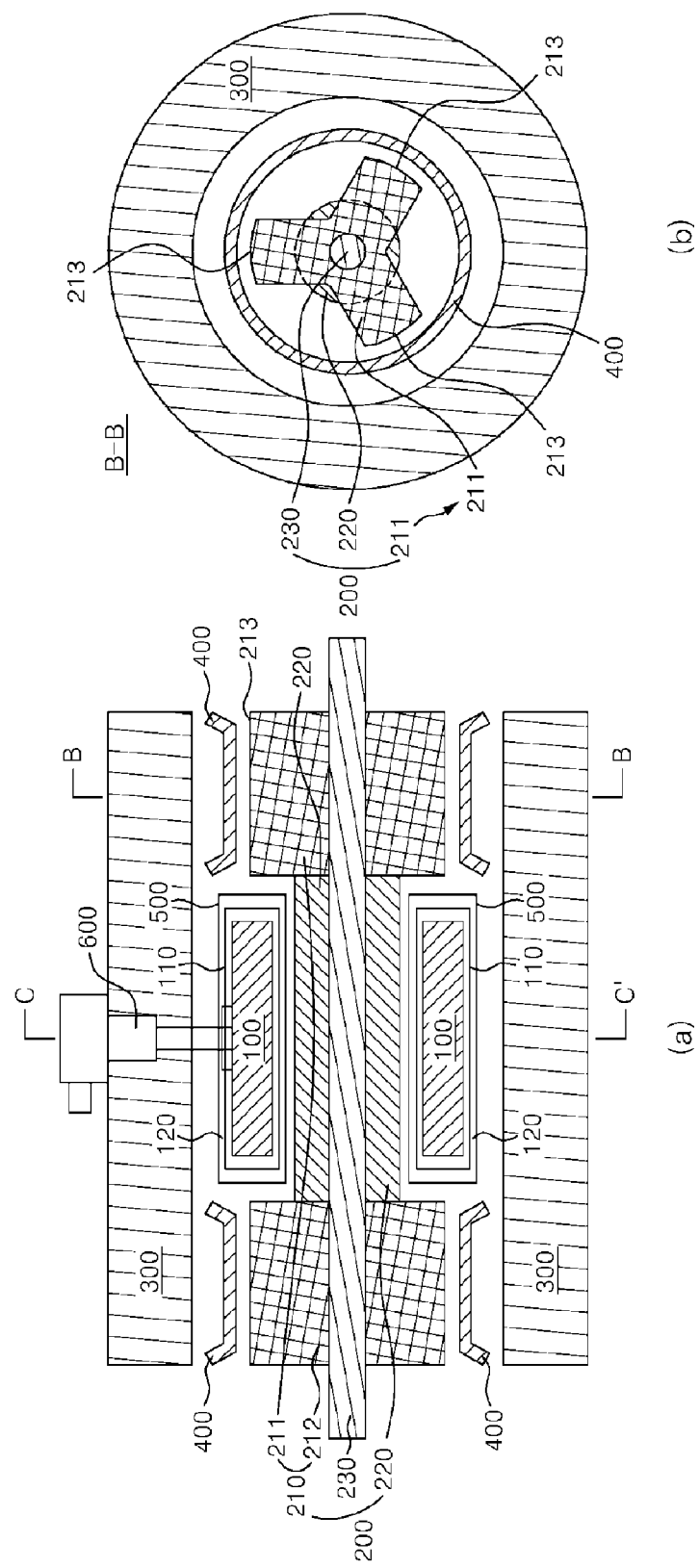
FIGS. 1a and 1b are views illustrating the construction of a superconducting synchronous machine according to the present invention.
Figure 2:
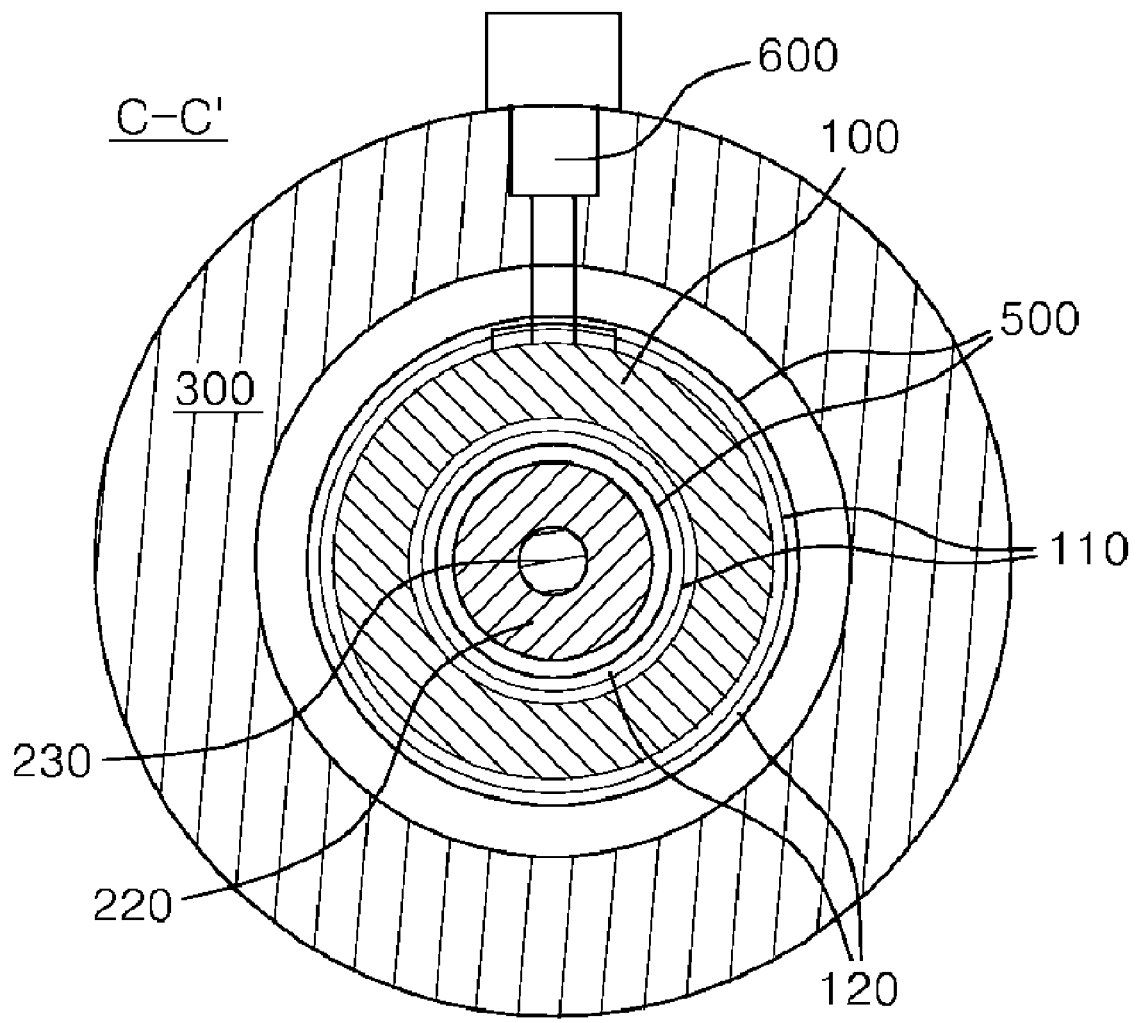
FIG. 2 is a view illustrating the construction of a superconducting field coil, a refrigerant tank, and a damper, which are important parts of the present invention.

FIGS. 1a and 1b illustrate the construction and shape of important parts of the superconducting synchronous machine according to the present invention, and FIG. 2 illustrates the superconducting synchronous machine according to the present invention, in which a superconducting field coil and a refrigerant tank are installed in the synchronous machine, and a cryo-cooler is connected to the superconducting field coil.

As shown in the drawings, the superconducting synchronous machine according to the present invention includes a superconducting field coil 100, a rotor 200, a stator 300, armature windings 400, and a damper 500.

The superconducting field coil 100 comprises a single pancake coil or a double pancake coil formed by winding a superconducting wire having the shape of tape. In order to acquire a desired magnetic field and intensity, a single or double pancake coil is used, or a plurality of single pancake coils or double pancake coils which are layered is used.

The superconducting field coil 100 which is formed by layering the single pancake coils or double pancake coils is coaxially coupled to a field core 220.

Here, the superconducting wire uses a Bi-2223 wire or a YBCO high temperature superconducting wire which is a wire of the second generation.

The superconducting field coil 100 is positioned between two inductors 210 which are made of a magnetic material, and is coaxially coupled to the field core 220 which is integrated with one inductor 210. DC power is applied to the superconducting field coil 100, so that the superconducting field coil 100 is excited by DC power and thereby one of the two inductors 210 becomes a N pole and the other becomes a S pole.

The inductors 210 include a first inductor 211 which is integrated with the field core 220, and a second inductor 212 which is opposite the first inductor 211. The first inductor 211 includes a plurality of salient poles 213 which protrude diametrically from one end of the field core 220. The second inductor 212 includes a plurality of salient poles 213 in such a way as to correspond to the salient poles 213 of the first inductor 211. Thereby, the number of the poles of the rotor 200 is six.

According to this embodiment, the number of the salient poles 213 is three. However, it is apparent to those skilled in the art that the number of the salient poles 213 be appropriately changed without being limited to three.

Further, the core-type stator 300 is provided outside the rotor 200, so that the cryo-cooler 600 is thermally coupled to the superconducting field coil 100.

Further, the armature windings 400 are provided in an air-cored configuration between the inner circumference of the stator 300 and the outer circumferences of the inductors 210 of the rotor 200, and are excited to three phases.

Here, the superconducting field coil 100 which is not rotated is provided in an air-cored configuration around the rotor 200 including the inductors 210 and the field core 220, thus generating a rotating magnetic field by the armature windings 400 which are excited to 3 phases and thereby rotating the rotor 200.

The superconducting field coil 100 is installed in the refrigerant tank 110 so as to maintain a very low operating temperature. Proper refrigerants such as liquid nitrogen or liquid neon are selected depending on the operating temperature.

As another cooling method, a G-M type or a pulse tube type cryo-cooler 600 may be directly connected to the stationary superconducting field coil 100, thus cooling the superconducting field coil 100 through a conduction cooling method.

This cooling method is advantageous in that various operating temperatures can be selected. Especially when the YBCO second generation wire which is currently expected to have the highest economic efficiency is used as the superconducting field coil, the cooling method can considerably increase the operating temperature. The cooling method can be used as the cooling method which is effective in the operation range within about 50K.

As shown in FIGS. 1a and 2, a vacuum layer 120 of about $10^{-5}$ Torr is formed outside the refrigerant tank 110 to prevent the penetration of heat from the exterior. The surface of the refrigerant tank 110 is covered with several layers of super-insulation, for example, an aluminum thin film having a very low emittance so as to prevent the transfer of radiant heat.

Finally, the cylindrical damper 500 is installed outside the refrigerant tank 110, and the vacuum layer 120 of about $10^{-5}$ Torr is formed between the refrigerant tank 110 and the inner surface of the damper 500.

Here, the damper 500 serves to intercept the AC magnetic field generated in the armature windings 400.

Thus, the characteristics of the homopolar superconducting synchronous machine which can easily meet high torque and static torque output characteristics for a large operating speed range and those of the revolving-field type superconducting machine will be compared to each other.

In the homopolar superconducting synchronous machine constructed as described above, the field coil is stationary, so that the superconducting field coil is not rotated while the machine is in operation. Thus, the construction of a device for cooling the superconducting field coil may be simplified.

Further, since the damper 500 is installed between the first and second inductors 211 and 212, an effective gap is reduced. Since the rotor is made of a magnetic material, the loss of magneto-motive force is reduced, so that the amount of superconducting wire is reduced. Since the field core 220 becomes a course of magnetic flux generated by the field coil, the effect of the magnetic field acting on the superconducting field coil 100 is reduced.

Thus, quenching caused by the magnetic field which may be generated in the field coil 100 is reduced. Air-gap magnetic flux density is not alternated, so that the volume of the machine is increased, but the cooling system is simplified and the volume of the whole system is reduced.

Further, since the rotor has a core structure using the magnetic material, the mechanical stability is increased. The machine may be multipolarized through a change in the number of the inductors. The field winding has the single or double pancake form, thus making it easy to perform a winding operation.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:
1. A superconducting synchronous machine, comprising:
a rotor having a shaft, a field core disposed on the shaft, a first inductor disposed on the shaft at one end of the field core, and a second inductor disposed on the shaft at the other end of the field core;

a superconducting field coil having an annular shape with a superconducting wire wound around the field core of the rotor and for exciting with DC power;

a refrigerant tank having the superconducting field coil installed in the refrigerant tank, the refrigerant tank containing a cryogenic refrigerant therein;

a stator having an annular shape and disposed outside the rotor and the superconducting field coil; and a cryo-cooler coupled to the stator and in communication with the refrigerant tank for cooling the superconducting field coil with the cryogenic refrigerant.

2. The superconducting field coil according to claim 1, further comprising:

an armature winding provided in the stator in such a way to surround the inductors, and for exciting to three phases.

3. The superconducting field coil according to claim 2, further comprising:

a damper provided to surround the superconducting field coil, and for intercepting radiant heat from the rotor and an AC magnetic field from the armature winding.

4. The refrigerant tank according to claim 3, further comprising:

several layers of super-insulation surrounding the refrigerant tank to prevent penetration of radiant heat, and a vacuum layer provided between the refrigerant tank and the damper.

5. The superconducting field coil according to claim 1, wherein the cryogenic refrigerant is liquid nitrogen or liquid neon.

6. A superconducting synchronous machine, comprising:

a superconducting field coil in a single pancake coil or a double pancake coil formed with a superconducting wire, and for exciting with DC power;

a rotor, comprising:

an inductor provided on each of opposite ends of the superconducting field coil, and made of a magnetic material;

a field core provided in a central opening of the superconducting field coil; and a shaft coaxially mounted to the inductor and the field core and for rotating around an axis;

a stator provided outside the rotor;

an armature winding provided in the stator in such a way as to surround the inductor, and excited to three phases; and a damper provided to surround the superconducting field coil, for intercepting radiant heat from the rotor and an AC magnetic field from the armature winding, wherein the superconducting field coil is installed in a refrigerant tank which contains a cryogenic refrigerant and is directly connected to a cryo-cooler to be cooled through a conduction cooling method, and several layers of super-insulation surrounding the refrigerant tank to prevent penetration of radiant heat, and a vacuum layer provided between the refrigerant tank and the damper.

7. The superconducting synchronous machine as set forth in claim 6, wherein the inductor comprises:

a first inductor integrated with the field core, and having a plurality of salient poles which protrude diametrically from an end of the field core; and a second inductor provided to be opposite the first inductor, and having a plurality of salient poles.

8. The superconducting synchronous machine as set forth in claim 7, wherein the superconducting field coil is provided between the salient poles of the first and second inductors.

9. The superconducting synchronous machine as set forth in claim 6, wherein the damper is provided outside the refrigerant tank and made of an aluminum or a copper alloy material so as to have strength for maintaining a strong vacuum, in addition to shielding an AC magnetic field which is generated in the event of abnormal operation.

10. The superconducting field coil according to claim 6, wherein the cryogenic refrigerant is liquid nitrogen or liquid neon.

* * * * *